US008566824B2

(12) United States Patent
Traut

(10) Patent No.: US 8,566,824 B2
(45) Date of Patent: *Oct. 22, 2013

(54) MIGRATING A VIRTUAL MACHINE TO A TARGET MACHINE

(75) Inventor: Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/917,312

(22) Filed: Nov. 1, 2010

(65) Prior Publication Data

US 2011/0047548 A1  Feb. 24, 2011

Related U.S. Application Data

(63) Continuation of application No. 10/966,021, filed on Oct. 15, 2004, now Pat. No. 7,840,963.

(51) Int. Cl.
G06F 9/455 (2006.01)
G06F 21/00 (2013.01)

(52) U.S. Cl.
USPC .................................................. 718/1; 711/6

(58) Field of Classification Search
None
See application file for complete search history.

(56) References Cited

U.S. PATENT DOCUMENTS

| | | | |
|---|---|---|---|
| 5,313,647 A | 5/1994 | Kaufman et al. | |
| 6,704,764 B1 | 3/2004 | Ottati | |
| 6,732,220 B2 | 5/2004 | Babaian et al. | |
| 6,795,966 B1 | 9/2004 | Lim et al. | |
| 6,802,062 B1 | 10/2004 | Oyamada et al. | |
| 6,850,953 B1 | 2/2005 | Deshpande et al. | |
| 7,093,086 B1 * | 8/2006 | van Rietschote | 711/161 |
| 7,191,441 B2 | 3/2007 | Abbott et al. | |
| 7,313,793 B2 | 12/2007 | Traut et al. | |
| 7,356,665 B2 | 4/2008 | Rawson, III | |
| 7,603,670 B1 | 10/2009 | van Rietschote | |
| 7,620,766 B1 * | 11/2009 | Waldspurger | 711/6 |
| 7,840,963 B2 * | 11/2010 | Traut | 718/1 |
| 2002/0038296 A1 | 3/2002 | Margolus et al. | |
| 2004/0055004 A1 | 3/2004 | Sun et al. | |
| 2004/0172574 A1 | 9/2004 | Wing et al. | |
| 2005/0132363 A1 | 6/2005 | Tewari et al. | |

OTHER PUBLICATIONS

Casas et al., "MPVM: A Migration Transparent Version of PVM", Oregon Graduate Institute of Science & Technology, Feb. 1995, 27 pages.
Kozuch et al., "Efficient State Transfer of Internet Suspend/Resume", Intel Corporation, May 2002, 13 pages.
Kozuch et al., "Internet Suspend/Resume", Intel Corporation, Apr. 2002, 9 pages.
Sapuntzakis et al., "Optimizing the Migration of Virtual Computers", Proceedings of the 5th Symposium on Operation Systems and Design and Implementation, Dec. 2002, 16 pages.

* cited by examiner

*Primary Examiner* — Kenneth Tang
(74) *Attorney, Agent, or Firm* — Woodcock Washburn, LLP

(57) ABSTRACT

The present invention is directed to systems and methods for providing disaster recovery services using virtual machines. The invention provides an inexpensive and minimally intrusive way to provide disaster recovery services including recovery of the state of computer processors and devices. The system includes a production host and a backup host that communicate via a communications link. The state of the processor and devices on the production host are periodically stored onto backup host and can be restored in the event of an emergency. Additionally, the invention includes two business methods for utilizing the system and methods for providing disaster recovery services.

11 Claims, 8 Drawing Sheets

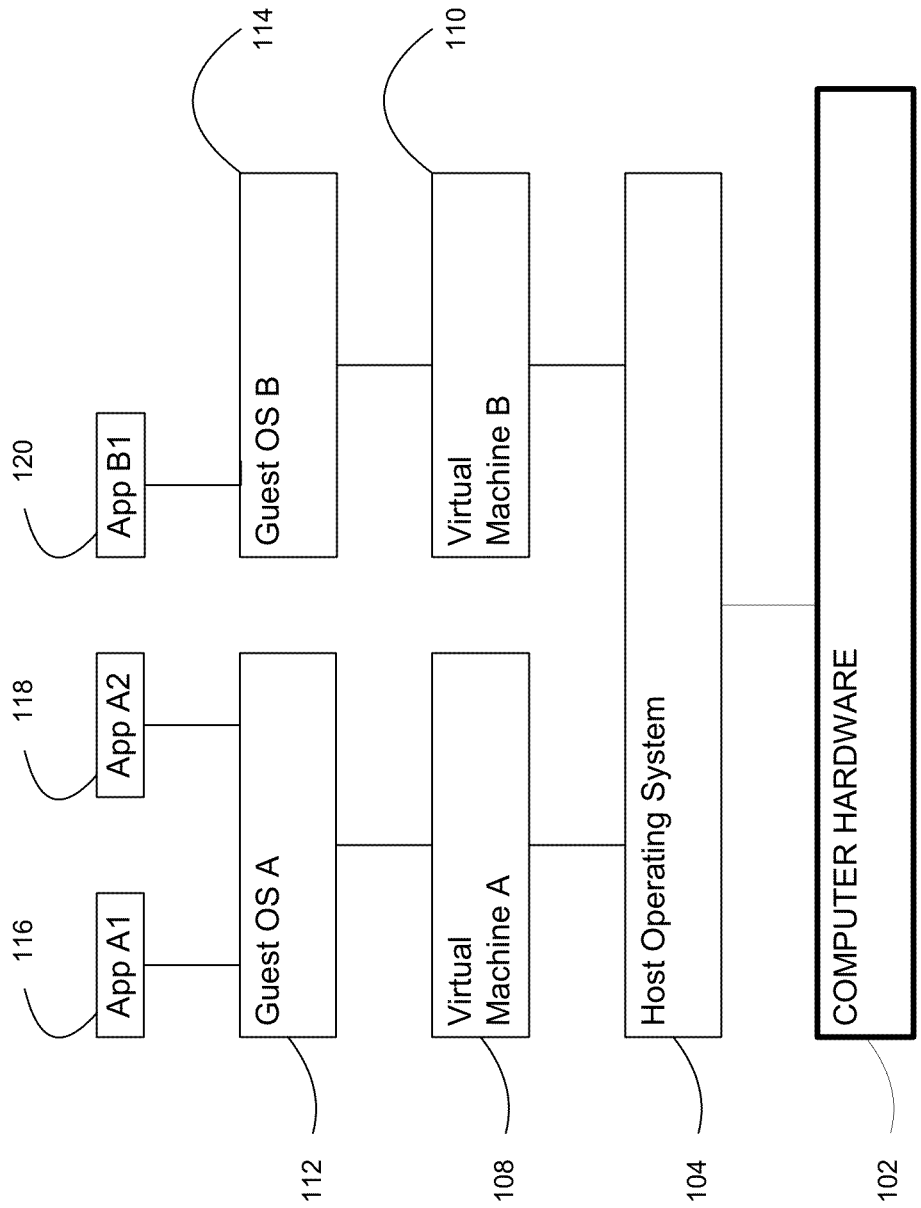

FIG. 7

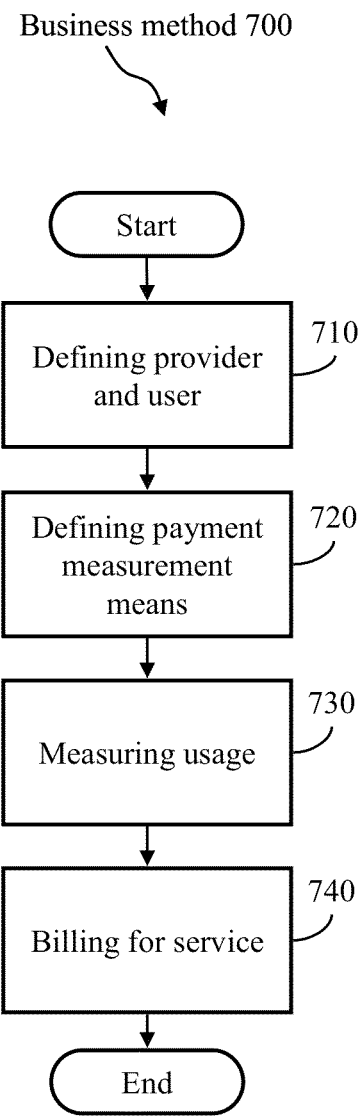

Business method 700

- Start
- Defining provider and user — 710
- Defining payment measurement means — 720
- Measuring usage — 730
- Billing for service — 740
- End

FIG. 8

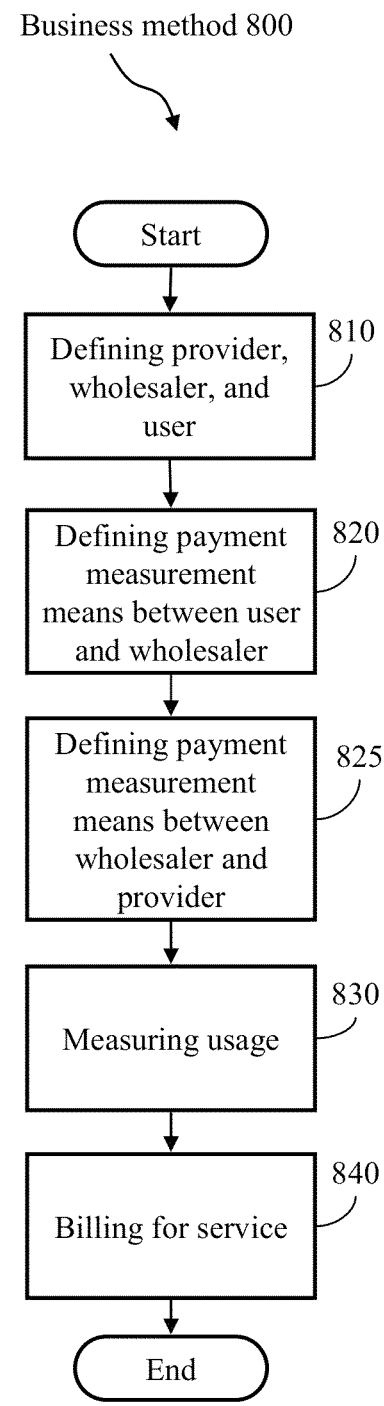

Business method 800

- Start
- Defining provider, wholesaler, and user — 810
- Defining payment measurement means between user and wholesaler — 820
- Defining payment measurement means between wholesaler and provider — 825
- Measuring usage — 830
- Billing for service — 840
- End

MIGRATING A VIRTUAL MACHINE TO A TARGET MACHINE

CROSS-REFERENCE

This application is a continuation of U.S. application Ser. No. 10/966,021, filed Oct. 15, 2004, now U.S. Pat. No. 7,840,963, the contents of which are hereby incorporated herein by reference. This application is also related to the following commonly-assigned patent application, U.S. patent application Ser. No. 10/193,531, filed Jul. 11, 2002, now U.S. Pat. No. 7,313,793, the entire contents of which are hereby incorporated herein this present application by reference.

FIELD

The present invention generally relates to the field of virtual machines (also known as "processor virtualization") and software that executes in a virtual machine environment, as well as to information technology (IT) disaster recovery services. More specifically, the present invention is directed to a low-cost and minimally-disruptive disaster recovery system utilizing virtual machine software running on at least two host computers in physically different locations, as well as to methods for using same, for restoring the state of a virtual machine in the event of a disaster.

BACKGROUND

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Virtual Machines

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software designed for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Disaster Recovery Systems

Because of the risk of potential "disaster" events—for example, power failures, natural disasters, hardware failures, and so on and so forth—enterprise IT companies and IT departments within larger enterprises (hereinafter simply "enterprises") are rightfully concerned about business continuity in the face of such a disaster. Such enterprises want to minimize downtime resulting from these disasters that may occur on computer systems in order to decrease the costs of such disasters where, for certain businesses, computer downtime can cost millions of dollars each minute. Therefore, when disasters and downtime do occur, it is important for the enterprise to ensure that computer systems will be back up and running as quickly as possible with as little disruption to users or customers as possible. Thus, in this regard, there are strong financial incentives for corporations to upgrade their disaster recovery systems in order to minimize computer system downtime.

It is understood in enterprise IT that when computers fail due to any type of disaster, the data (e.g., orders, customer information, document files) that is typically stored in persistent memory (e.g., hard disks) is the most critical information to restore, and several methods of data backup—including data mirroring, tape backup solutions, redundant disk arrays, and the like—are well known in the art. However, in order to more fully recover from a computer failure, it is also critically important to store and recover the "state" of the computer system as that state exists at a time immediately prior to a failure event. Storing and recovering the state of the computer allows the enterprise to provide a more complete and minimally disruptive restoration. In this regard, and in order for a state recovery system to effectively restore the state of the computer, it is essential that information regarding the applications running on the computer be stored as well as the state of its processor and devices.

However, from a cost perspective—that is, the relative costs of utilizing a state recovery system versus the incurred costs of downtime stemming from a disaster—an enterprise will naturally choose the lower-cost option and, as part of this analysis, the cost of a state recovery system must include the cost for upgrades. For example, if the organization needs to upgrade its state recovery system, it is preferable to do so in a low-cost manner, such as by adding a new module to an existing state recovery system rather than replacing the entire existing system. If the cost of system upgrades is too high, then the cost of a state recovery system may also be too high and force an enterprise to instead elect to bear the lesser burden of costs for downtime from disasters.

Unfortunately, current methods utilized to back up and restore the state of computers are cost prohibitive, while inexpensive solutions that provide minimally intrusive backup and restoration of the state of a computer currently do not exist. For example, one specific solution developed by Marathon Technologies is to perform lock-step state comparison for each I/O request between two computers (one in production and one as a backup copy) across a data link; however, this type of solution requires expensive fiber-optic connectivity between the computers and thus is cost-prohibitive for all but the largest corporations with the deepest pockets. Another solution is to provide a fault-tolerant/fault-resilient computer system that includes at least two computing elements (CEs) connected to at least one controller where one secondary CE functions as a backup to another primary CE and replaces the primary CE without disruption to users if the primary CE fails; however, this solution also requires an expensive fiber-optic communications link and thus is very expensive to implement. In contrast, existing methods of storing and recovering the state of a computer using communication links having lower bandwidth than fiber optics are undesirable because they are disruptive to the user as these methods generally require that the computer be stopped for the amount of time that it takes to transfer the data from the processor and the devices across the communications link for durations that range from a few seconds to several minutes and which can result in loss of productivity as well as disruptive events such as dropped network connections and a lack of service continuity for the users of the computer.

Therefore, there is a need in the art is a low-cost means for storing and recovering the state of a computer system that minimizes disruptions to end-users of said computer system.

SUMMARY

Various embodiments of the present invention are directed to systems and methods for low-cost storage and recovery of the state of a first computer system (a "production host") using a second computer system (a "backup host") with minimal disruption to users of said computer system. More specifically, various embodiments of the present invention are directed to providing a software service that is minimally-interrupted by hardware- or software-based disaster events.

For several embodiments of the present invention, a software service (or "production") is executed directly or indirectly (via a guest operating system) on a virtual machine (emulated hardware) that, in turn, executes directly or indirectly (via a host operating system) on physical computer hardware. The state information for this virtual machine (and for the software service) is then stored and continuously updated for a second ("backup") virtual machine that takes over when the first virtual machine becomes unavailable. In addition, and for certain of these embodiments, the second virtual machine, while executing after a failure by the first virtual machine, checks to see when the first virtual machine comes back online and transfers processing (and current state information) to said first virtual machine.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3A illustrates a virtualized computing system;

FIG. 7 is a block diagram illustrating a business method for utilizing the system of FIG. 4 and the method of FIG. 5 to generate revenue; and FIG. 8 is a block diagram illustrating an alternative business method for utilizing the system of FIG. 4 and the method of FIG. 5 to generate revenue.

DETAILED DESCRIPTION

The inventive subject matter is described with specificity to meet statutory requirements. However, the description itself is not intended to limit the scope of this patent. Rather, the inventor(s) has (have) contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
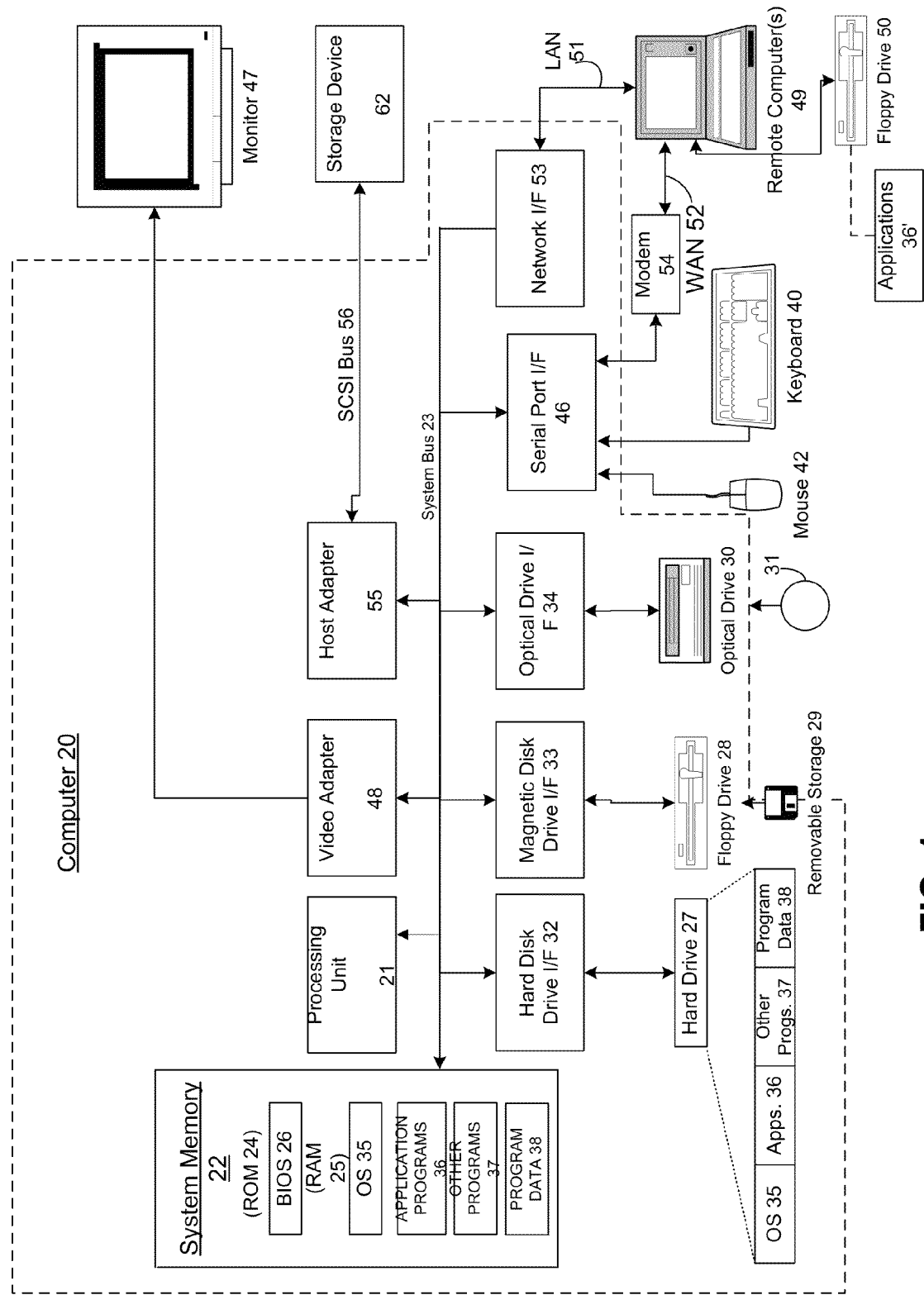
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
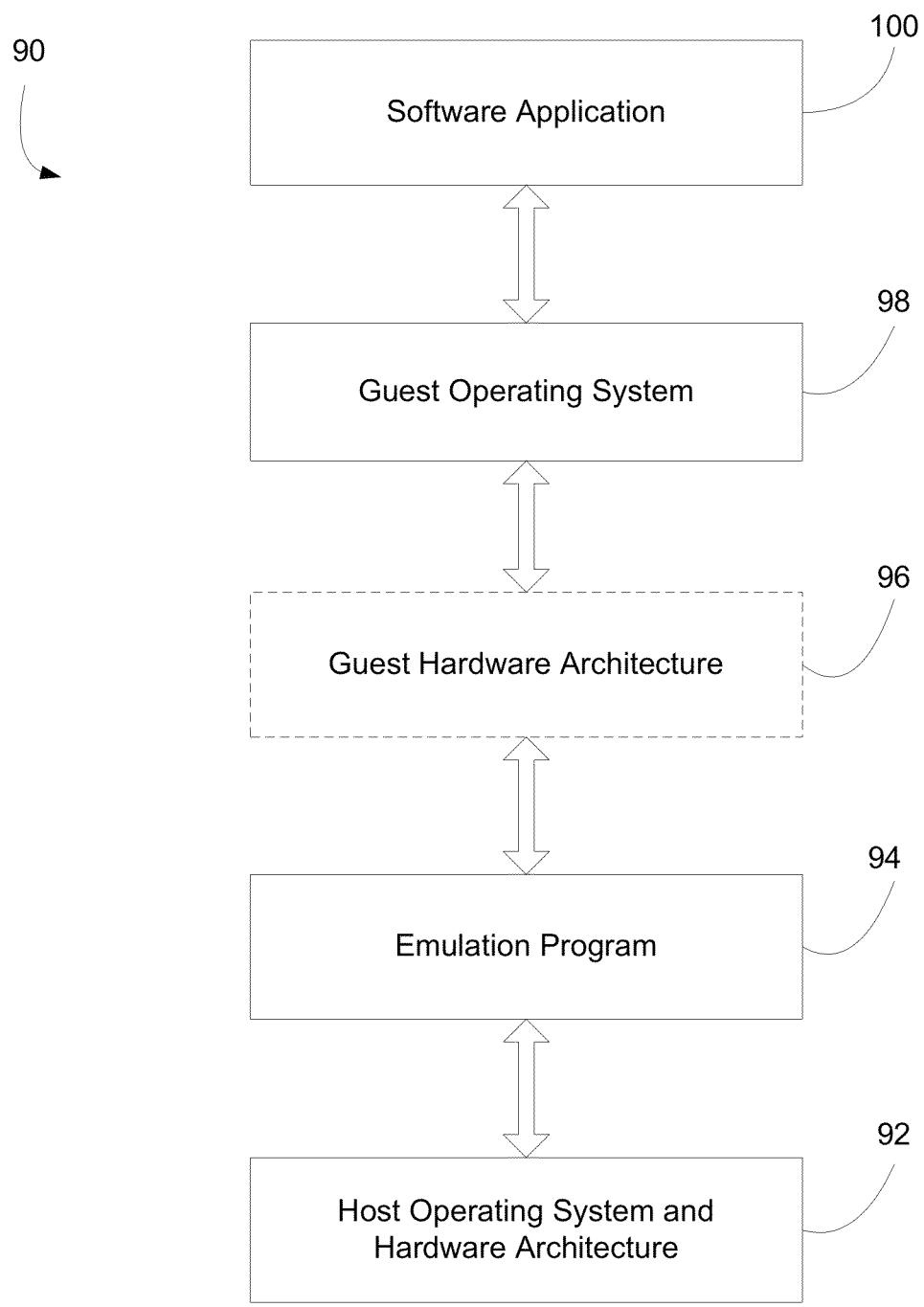
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 (shown in broken lines as this guest hardware architecture 96 is actually a software representation exposed by said emulation program 94). Guest operating system 98 executes with said guest hardware architecture 96 as it would with real physical hardware of the same architecture. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

The host operating system software layer 104 may, for certain embodiments, comprise a hypervisor. A hypervisor is a control program that exists near the kernel level of a host operating system and operates to allow one or more secondary operating systems, other than the host operating system, to use the hardware of the computer system, including the processor of the computer system. A hypervisor of an operating system emulates the operating environment of the secondary operating system so that the secondary operating system believes that it is operating in its customary hardware and/or operating system environment and that it is in logical control of the computer system, when it may in fact be operating in another hardware and/or operating system environment and the host operating system may be in logical control of the computer system. Many operating systems function such that the operating system must operate as though it is in exclusive logical control of the hardware of the computer system. For multiple operating system to function simultaneously on a single computer system, the hypervisor of each operating system must function to mask the presence of the other operating systems such that each operating system functions as though it has exclusive control over the entire computer system.

Figure 3B:
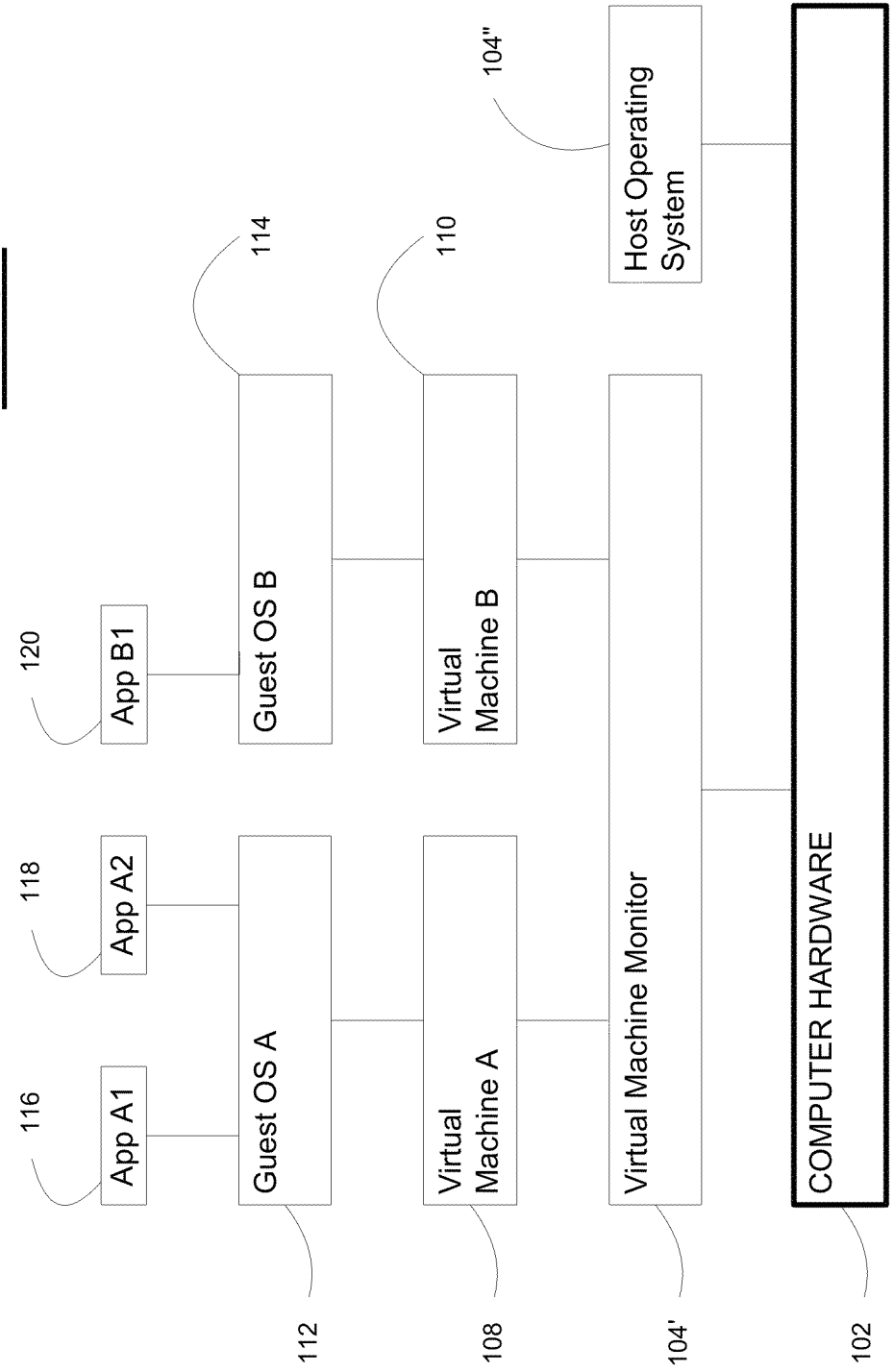
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors or an Intel 486 processor, Intel 586 process, etc. Above each VM 108 and 110 are guest operating systems (guest OSs) A 112 and B 114 respectively. Above guest OS A 112 are running two applications, application A1 116 and application A2 118, and above guest OS B 114 is Application B1 120.

VM Disaster Recovery System

For several embodiments of the present invention, a software service (or "production") is executed directly or indirectly (via a guest operating system) on a virtual machine (emulated hardware) that, in turn, executes directly or indirectly (via a host operating system) on physical computer hardware. The state information for this virtual machine (and for the software service) is then stored and continuously updated for a second ("backup") virtual machine that takes over when the first virtual machine becomes unavailable. In addition, and for certain of these embodiments, the second virtual machine, while executing after a failure by the first virtual machine, checks to see when the first virtual machine comes back online and transfers processing (and current state information) to said first virtual machine.

Figure 4:
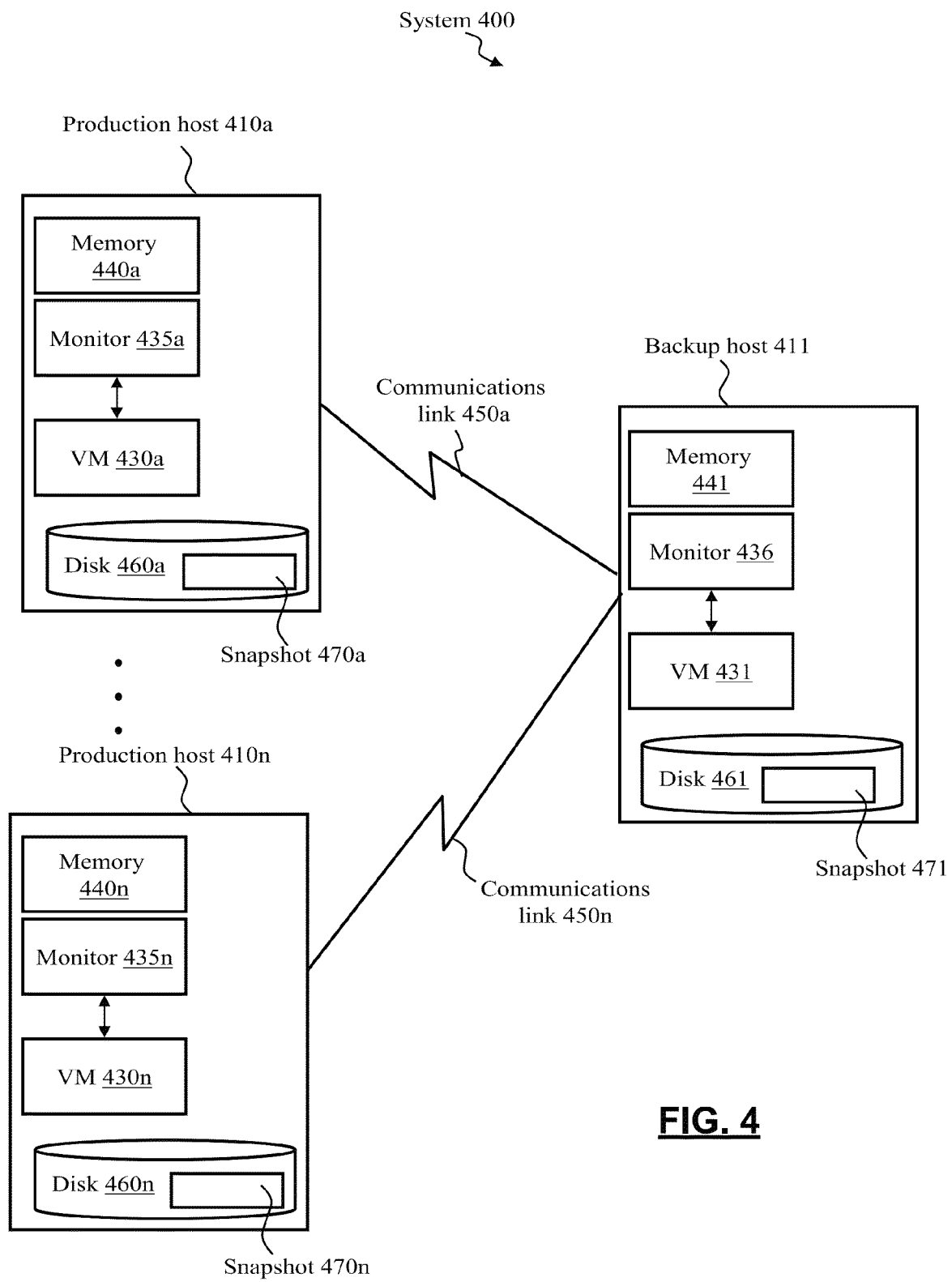
FIG. 4 is a block diagram illustrating a VM-based disaster recovery system for one or more production hosts using a backup host.

FIG. 4 shows a disaster recovery system 400 including one or more production hosts 410 (represented herein by a production host 410a and a production host 410n) and a backup host 411 for which various embodiments of the present invention may be utilized. Production hosts 410 are connected to backup host 411 by one or more communications links 450 (represented herein by a communications link 450a and a communications link 450n).

For several embodiments of the present invention, production host 410a contains a memory 440a, a virtual machine (VM) 430a, a monitor 435a, and a disk 460a. Disk 460a further contains a snapshot 470a. Production host 410n similarly contains a memory 440n, a VM 430n, a monitor 435n, and a disk 460n containing a snapshot 470n. Backup host 411 contains a memory 441, a VM 431, a monitor 436, and a disk 461 containing a snapshot 471. Memory 440a, memory 440n, and memory 441 are non-persistent storage means such as random access memory (RAM). Memory 440a, memory 440n, and memory 441 typically comprise the top layers of a data storage subsystem.

Communications links 450 are channels by which data can be transmitted between hosts (e.g., between production host 410a and backup host 411) in system 400. Communications links 450 may be any of the following including, but not limited to, a conventional 400 MB/s Ethernet cable and/or a conventional 1 GB/s Ethernet cable. The physical length of communications links 450 depends on the backup requirements of system 400. In one example, system 400 is implemented to prevent data and state loss due to earthquake or nuclear bomb detonation and communications links 450 are 25 km long (with conventional signal repeaters as needed). In another example, system 400 is implemented to prevent data and state loss due to a simple power failure and communications links 450 are 250 m long so as to reach another room in the same building in which sufficient electrical backup (e.g., diesel generators) is available.

Disk 460a, disk 460n, and disk 461 are conventional hard disk drives, such as a SCSI or IDE magnetic disk drives. Disks 460a, 460n, and 461 store snapshots 470a, 470n, and 471, respectively. Snapshots 470a, 470n, and 471 are the disaster recovery files containing the state of the processor and devices of production hosts 410. Snapshot 470a contains the state of production host 410a, snapshot 470n contains the state of production host 410n, and snapshot 471 contains the states of all production hosts 410.

Production hosts 410 and backup host 411 are computing means such as a personal computer, server, or mainframe computer. Production host 410a, production host 410n, and backup host 411 run VM 430a, VM 430n, and VM 431, respectively. VM 430a, VM 430n, and VM 431 are virtual machine software, such as that provided by Connectix/Microsoft Corporation. VM 430a, VM 430n, and VM 431 minimally provide production host 410a, production host 410n, and backup host 411, respectively, with a means for processor virtualization and a means for device emulation.

Processor virtualization synthesizes a processor in such a way that software functions on the synthetic processor as if the software were running on a conventional, dedicated processor. Device emulation allows synthesis of peripheral devices within a computer, such as an interrupt controller, a PCI bus, a video display, keyboard, mouse, network card, etc. Both processor virtualization and device emulation functionalities within VM 430a, VM 430n, and VM 431 contain the state of the processor and devices.

Production hosts 410 and backup host 411 may be running different operating systems (OSs) on different processor architectures, though the production hosts 410 and backup host 411 are compatible to the extent that they are able to run the same virtual processor (e.g., x86 or SPARC) and provide the same core virtual devices (e.g., PCI devices or memory devices) in order to ensure that, if production host 410a or production host 410n fails in a disaster, backup host 411 is able to load the saved state of production host 410a or production host 410n and continue. The storage and recovery of these states in a minimally intrusive and cost-effective way is central to the present invention.

Optional monitor 435a, optional monitor 435n, and monitor 436 are software applications that enable users of system 400 to set and enforce parameters of the system. Two exemplary parameters that are set and enforced with monitor 435a, monitor 435n, and monitor 436 include (1) how often the state of production host 410 is stored and (2) billing and accounting mechanisms. Monitor 436 is not optional because it is additionally responsible for monitoring the status of production hosts 410 in case of a disaster. Monitors 435a, 435n, and 436 direct VM 430a, VM 430n, and VM 431, respectively, to store snapshot 470a, snapshot 470n, and snapshot 471, respectively, onto disk 460a, disk 460n, and disk 461, respectively, based on the parameters entered.

Production host 410n is shown in FIG. 4 in order to show that backup host 411 could be used to store the state of more than one production host and that, for certain embodiments, there could be any number of production hosts in system 400 that utilize backup host 411. Alternatively, production host 410n can also be used as a backup host to production host 410a that would be started in the event of a disaster, where production host 410n could obtain snapshot 471 from backup host 411 and resume the state of production host 410a as of the last recorded state.

Backup host 411 is similar to production hosts 410 and, in some cases, is identical to production hosts 410. The primary difference between backup host 411 and production hosts 410 is that disk 461 requires a larger storage capacity than disks 460 because backup host 411 is a storage site for at least one production host 410, and optionally for many production hosts 410. In operation, production hosts 410 and backup host 411 operate within system 400. The state of the processors and devices within production hosts 410a through 410n are periodically stored and sent via communications link 450a through 450n, respectively, to backup host 411, where the states are stored on disk 461. The periodic frequency is set by a user of system 400 and is entered and enforced with monitor 436 and optionally with monitors 435.

For certain alternative embodiments of the present invention, backup host 111 may not be required to be running VM 131, but it may have capability to run VM 131 within an acceptable amount of time for the organization. In one example, this means that VM 131 has been loaded, but is not continually running on backup host 111. In this example, VM 131 can be started and the state of production hosts 110 can be restored on backup host 111 within an acceptable amount of time.

In other alternative embodiments of the present invention, system 100 may contain more than one backup host 111. By incorporating more than one backup host 111, the number of production hosts 110 that can be supported can be increased due to increased capacity provided by multiple disks 161. Additionally, a system and method of redundant backup hosts 111 that provide backup for each other is part of the present invention.

VM Disaster Recovery Methodology

Figure 5:
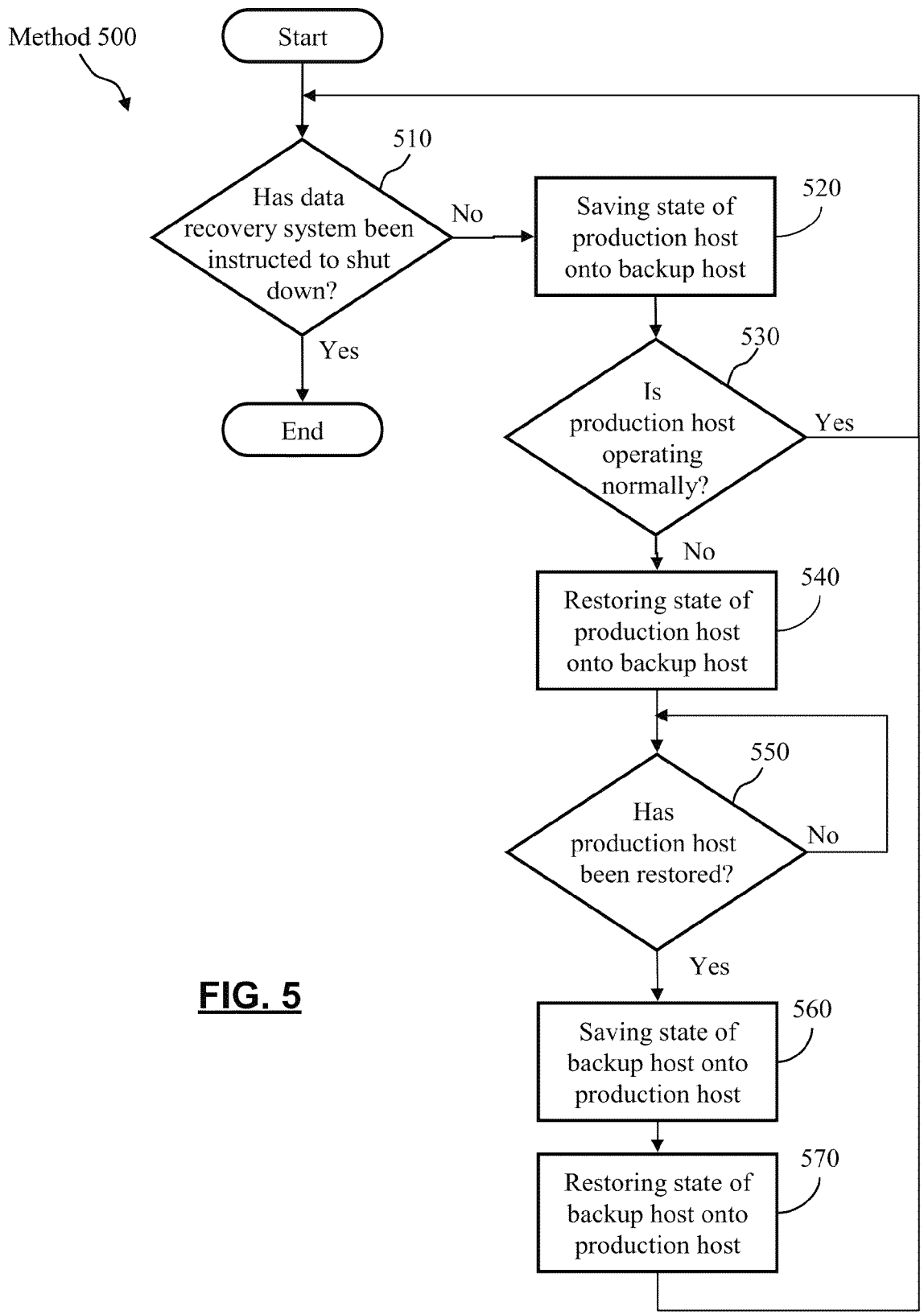
FIG. 5, with reference to the system elements of FIG. 4, is a process flow diagram illustrating a methodology for the disaster recovery system for various embodiments of the present invention.

FIG. 5, with reference to the system elements of FIG. 4, illustrates a high-level method for system 400 regarding the basic functions of monitor 436 for various embodiments of the present invention. At step 510 monitor 436 determines whether a request to shut down system 400 has been received and, if so, method 500 ends. If not, at step 520 monitor 436 directs VM 430 of the appropriate production host 410 to save snapshot 470 onto disk 461 on backup host 411 for the purposes of disaster recovery. (The details of this process are described in more detail in FIG. 3.) At step 530, monitor 436 sends data to production host 410 via the associated communications link 450 to determine whether production host 410 is operating normally and, if so, it sends data indicating normal operation to monitor 436 (i.e., takes no other action) and returns to step 510 for continued monitoring. On the other hand, if production host 410 is not operating normally—either because monitor 436 receives a message from production host 410 indicating such or because monitor 436 receives no reply at all—then at step 540, the monitor 436 directs VM 431 to restore the state of the processor(s), devices, and, optionally, data of production host 410 onto backup host 411 by opening snapshot 471. VM 431 is started (if not already running), and backup host 411 is placed into production, replacing production host 410. As a result of this step (and likewise in step 570 below), any software applications and/or computers that were communicating with production host 410 before the disaster occurred (and production host 410 went down) are redirected to backup host 411 and hereafter communicating with backup host 411 in place of production host 410. It should be noted that, upon startup, the state of backup host 411 is identical to the state of production host 410 at the time that snapshot 471 was last saved, and the periodic frequency with which snapshot 471 is saved can be determined by the enterprise (which determines how much state information loss is acceptable by weighing business and technical factors, such as any costs associated with running method 500, the bandwidth limitations of communications links 450, etc.).

After restoring the state of the production host onto the backup host (i.e., starting up the backup host to replace to lost production host) and throughout subsequent operations, at step 550 monitor 436 determines whether production host 410 has been restored by sending data via communications link 450. If data indicating normal operation is not sent back to monitor 436 from production host 410, production host 410a is not considered restored and backup host 411 continues production operations (in place of the down production host 410) and the method returns to step 450 (after an appropriate waiting period if so desired). On the other hand, if production host 410 has been restored then, at step 560, monitor 436 directs VM 430 to save snapshot 471 onto disk 460 of the appropriate production host 410 for the purposes of restoring the state of backup host 411 onto production host 410 in preparation resumption of normal operations and, at step 570, monitor 436 directs VM 430 to restore the state of the processor(s), devices, and, optionally, data of backup host 411 onto production host 410 by opening snapshot 471. This essentially results in production host 410 being placed into production again, replacing backup host 411 and resuming normal operations. At the completion of this step, the method 500 returns to step 510 to resume disaster monitoring.

Preserving State Information

Figure 6:
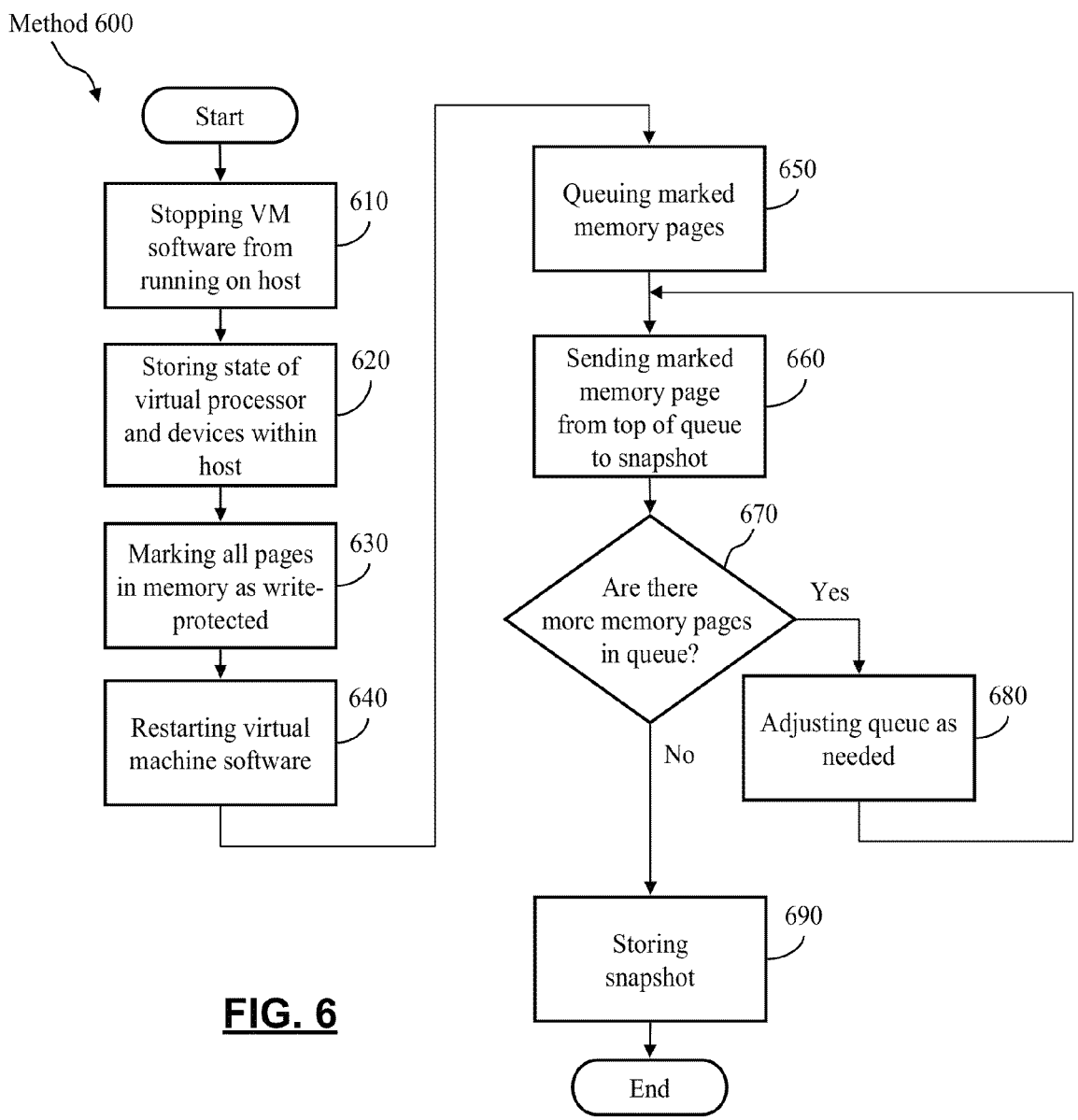
FIG. 6 is a process flow diagram illustrating a method of saving the state of processor, devices, and applications from one host to another for several embodiments of the present invention.

FIG. 6 is a process flow diagram illustrating a method 600 of saving the state of processor, devices, and applications from one host (the source host) to another (the target host) for several embodiments of the present invention and is described here to demonstrate how method 600 would be utilized in steps 520 and 560 of method 500 of FIG. 5 discussed earlier herein. For this example, it is presumed that the source host is a production host 410 and the target host is backup host 411 as would be the case for step 520 of FIG. 5, while parentheticals "( )" are provided for to describe the reverse case for step 560.

At step 610, the appropriate production host 410 (or backup host 411) is stopped in preparation for saving its state data into snapshot 470 (or snapshot 471). In this step, there may also a brief period of waiting for any previously submitted I/O requests that have not completed to finish—for example, this waiting period may be as little as a few microseconds or, if the pending I/O request is a disk action, the waiting period may be a few milliseconds. In any event, the process of stopping production host 410 (or backup host 411) includes stopping VM 430 from running on production host 410 (or stopping VM 431 from running on backup host 411). By limiting the activity on production host 410 (or backup host 411) at the time the snapshotting is being done, snapshot 470 (or snapshot 471) is created without ongoing I/O activity changing the state of the machine before snapshot 470 (or snapshot 471) is completed.

At step 620, the state of the virtual processor and all virtual devices (excluding the memory subsystem) within production host 410 (or backup host 411) is saved synchronously into snapshot 470 (or snapshot 471). Then, at step 630, all pages in memory 440 (or memory 441) are marked as write-protected as a minimally intrusive way of saving the state of memory 440 (or memory 441) since marking the memory pages is a fast process and thus there is minimal (if any) noticeable effect on the user of production host 410 (or backup host 411). At step 640, VM 430 (or VM 431) is started again, reversing the stoppage that occurred in step 610; at step 650, the memory pages marked in step 630 are queued up in memory 440 (or memory 441) in preparation for sending to snapshot 470 on disk 460 (or snapshot 471 on disk 461); and, at step 660, the memory page from the top of the queue is stored in snapshot 470 on disk 460 (or snapshot 471 on disk 461). At step 670 system 400 determines whether there are more memory pages in queue to be sent to snapshot 470 (or snapshot 471) and, if not, method 600 proceeds to step 690; but, if so, at step 680 monitor 435 (or monitor 436) re-orders and/or adjusts the queue of memory pages as needed and then returns to step 660 for further processing until there are no more pages in the queue (determined by step 670).

In regard to step 680, it should be noted that marking the pages (back in step 630) allows monitor 435 (or monitor 436) to make the adjustments to this queue based on need for the memory pages within backup host 411 (or production host 410). In an example in which VM 430 (or VM 431) needs to write to a memory page that has not yet been sent to snapshot 470 (or snapshot 471), the queue is re-ordered with the particular memory page that VM 430 (or VM 431) needs to write to at the top of the queue. In another example in which VM 430 (or VM 431) needs to write to a memory page that has not yet been sent to snapshot 470 (or snapshot 471), the queue is not re-ordered; rather, a copy of the particular memory page is created and added to the queue, and the memory page itself is un-marked, allowing VM 430 (or VM 431) access to that page. Either of these examples allow VM 430 (or VM 431) access to the page as quickly as possible with minimal disruption to production host 410 (or backup host 411).

Once there are no more memory pages in the queue (as determined at step 670), at step 690 snapshot 470 (or snapshot 471) is stored for use as a backup of the state of production host 410 (or backup host 411). In one example, snapshot 470 (or snapshot 471) is stored on disk 460 (or disk 461) and then sent to disk 461 (or disk 460) via communications link 450 after the file is complete. In another example, snapshot 470 (or snapshot 471) is directly written to disk 461 (or disk 460) via communications link 450. Upon completion of step 690, method 600 ends.

While these particular embodiments assumes the use of traditional data backup techniques—such as data mirroring, RAID disks, and/or tape drive solutions—using typical persistent storage devices—such as hard drives, electrically erasable programmable read-only memory (EEPROM) memory, and the like—for certain alternative embodiments the data from persistent storage devices (e.g., disk 460) may be backed up in differencing drives (not shown) in addition to the state of the processor and devices being stored into snapshot files. Differencing drives contain data from persistent storage and are can be used in combination with snapshot (e.g., snapshot 470 or 471) to restore both the state of the processor(s) and devices, and the data with virtual machine software (e.g., VM 430 or 431).

VM Disaster Recovery Business Method

Several embodiments of the present invention are also directed to a method of business 700 for using system 400 of FIG. 4 and method 500 of FIG. 5 where an end-user pays the provider for recovery services as illustrated by FIG. 7. In this figure, business method 700 initially comprises, at step 710, defining the entities and their roles in the business method. For example, one entity may be defined as the provider of disaster recovery services (e.g., the owner/operator of backup host 411), while another entity may be defined as the user (consumer, purchaser, etc.) of disaster recovery services (e.g., the owner/operator of production host 410). Then, at step 720, the payment measurement means is defined prior to starting method 600. For example, one means for payment (e.g., currency, credit deduction, license time deduction) might be to require users of method 600 to pay according to one of the following measurements: (a) users of method 600 pay the provider for services based on bandwidth usage across communications link 450; (b) users of method 600 pay the provider for service based on number of bits sent across communications link 450; (c) users of method 600 pay the provider for service based on the number of snapshots 470 submitted from production host 410 to backup host 411; (d) users of method 600 to pay the provider for service based on the number of "restores" performed (where the price per restore would be a much higher fee than the price per individual service in the other examples described in this step since restores will be performed only very irregularly, such as after a disaster requiring a restore occurs).

At step 730, usage may be measured according to the payment measurement means defined in step 720. There are two key functions in this step: (1) authenticating production host 410 for security and billing purposes; and (2) tracking the payment measurement means. This usage may be measured using any of a variety of different ways for each of the examples mentioned in step 720. In one example, a software program may be installed on backup host 411, and monitor 436 on backup host 411 or another piece(s) of software authenticates production host 410 and measures the usage of system 400.

At step 740, and at the end of the billing period, the user that is running production host 410 is sent a bill requesting payment for disaster recovery services rendered. In one example, the user pays the bill electronically (e.g., via credit card or electronic funds transfer). In another example, the user receives a paper bill via conventional mail and submits payment via a conventional paper check. The process then ends.

For certain alternative embodiments of the present invention, and as illustrated in FIG. 8, the business method may instead include a user (consumer, purchaser, etc.) that operates production host 410 and a wholesaler of recovery services that purchases or licenses access from a provider operating backup host 411. In this business method 800, the user pays the wholesaler and the wholesaler pays the provider for recovery services.

At step 810, the entities and their roles in business method 800 are defined. In one example, one entity is defined as the provider of disaster recovery services (e.g., the owner/operator of backup host 411); a second entity is defined as a wholesaler of recovery services that either purchases, owns, and operates backup host 411 or licenses access from a provider that operates backup host 411; and a third entity is defined as the user (consumer, purchaser, etc.) of disaster recovery services (e.g., the owner/operator of production host 410). In this business method, the wholesaler is a typically a specialist in providing disaster recovery services. Then, at step 820, the payment (e.g., currency, credit deduction, license time deduction) measurement means between user and wholesaler is defined prior to starting method 600. The payment measurement means between the user and wholesaler can be defined any of a number of ways including, but not limited to, the following: (a) for users of method 600 to pay the wholesaler for service based on bandwidth usage across communications link 450; (b) for users of method 600 to pay the wholesaler for service based on number of bits sent across communications link 450; (c) for users of method 600 to pay the wholesaler for service based on the number of snapshots 470 submitted from production host 410 to backup host 411; and (d) for users of method 600 to pay the wholesaler for service based on the number of "restores" performed (where the price per restore would be a much higher fee than the price per individual service in the other examples described in this step because restores will be performed only very irregularly, that is, after a disaster requiring a restore occurs).

At step 825, the payment measurement means between wholesaler and provider is defined prior to starting method 600. The payment measurement means between the wholesaler and the provider can be defined any of a number of ways, including, but not limited to the following: (a) for wholesalers of method 600 to pay the provider of backup host 411 and all appropriate software licenses (such as those for VM 431 and monitor 436), where the wholesaler is the owner and operator of backup host 411 and maintains communications link 450; (b) for wholesalers of method 600 to pay a license fee to the provider, said license fee payable periodically, and said fee would be negotiable based on any number of factors (such as the number of users the wholesaler is supporting, the amount of storage space used within disk 461, etc.); (c) for wholesalers of method 600 to pay the provider for service based on number of bits sent across communications link 450; (d) for wholesalers of method 600 to pay the provider for service based on the number of snapshots 470 submitted from production host 410 to backup host 411; (e) for wholesalers of method 600 to pay the provider for service based on the number of "restores" performed (where the price per restore would be a much higher fee than the price per individual service in the other examples described in this step, because restores will be performed only very irregularly, that is, after a disaster requiring a restore occurs).

At step 830, usage is measured according to the payment measurement means defined in step 820. There are two key functions in this step: (1) authenticating production host 410 for security and billing purposes, and (2) tracking the payment measurement means. This usage is measured using any of a variety of different ways for each of the examples mentioned in step 820. In one example, a software program is installed on backup host 411, and monitor 436 on backup host 411 or another piece(s) of software authenticates production host 410 and measures the usage of system 400.

At step 840, and at the end of the billing period, the user (and optionally the wholesaler) that is running production host 410 is sent a bill requesting payment for disaster recovery services rendered. In one example, the user (and optionally the wholesaler) pays the bill electronically (e.g., via credit card or electronic funds transfer). In another example, the user (and optionally the wholesaler) receives a paper bill via conventional mail and submits payment via a conventional paper check. In another example, the user (and optionally the wholesaler) receives a credit deduction in return for services rendered. The process then ends.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for migrating a virtual machine from a host machine to a target machine, said method comprising:
    causing execution of a first virtual machine executing on the host machine to be halted;
    receiving and storing a set of state information corresponding to said first virtual machine for utilization by a second virtual machine on the target machine;
    causing portions of a memory state of said first virtual machine to be marked;
    causing execution of said first virtual machine to be resumed;
    receiving and storing, during execution of said first virtual machine, portions of the memory state of said first virtual machine, the marked portions of the memory state being queued for delivery when said first virtual machine indicates that the marked portions will be modified; and
    modifying an ordering of the queued marked portions of the memory state as one or more portions of the memory state of said first virtual machine are delivered.

2. The method of claim 1, wherein a copy of the marked portions is created and queued for delivery and the marked portions are unmarked when said first virtual machine indicates that the marked portions will be modified.

3. The method of claim 1, wherein the marked portions of the memory state are marked as write-protected.

4. A system for migrating a virtual machine from a host machine to a target machine, said system comprising:
    at least one processor;
    at least one memory communicatively coupled to said at least one processor, the memory having stored therein computer-executable instructions that, when executed by said at least one processor, cause the system to:
    cause the execution of a first virtual machine executing on the host machine to be halted;
    receive and store a set of state information corresponding to said first virtual machine for utilization by a second virtual machine on the target machine;
    cause portions of a memory state of said first virtual machine to be marked;
    cause the execution of said first virtual machine to be resumed;
    cause the marked portions of the memory state to be queued for delivery, wherein an ordering of the queued marked portions is modified in response to delivery of at least one of the marked portions; and
    receive and store, during execution of said first virtual machine, the marked portions of the memory state of said first virtual machine.

5. The system of claim 1, wherein the marked portions of the memory state are queued for delivery when said first virtual machine indicates that the marked portion will be modified.

6. The system of claim 5, wherein the marked portions of the memory state are marked as write-protected.

7. The system of claim 5, wherein a copy of the marked portions is created and queued for delivery and the marked portions are unmarked when said first virtual machine indicates that the marked portions will be modified.

8. The system of claim 5 further comprising causing the second virtual machine to execute on the target machine using the set of state information.

9. A computer-readable storage medium comprising computer-readable instructions for migrating a virtual machine from a host machine to a target machine, said computer-readable instructions comprising instructions for:
    causing execution of a first virtual machine executing on the host machine to be halted;
    receiving and storing a set of state information corresponding to said first virtual machine for utilization by a second virtual machine on the target machine;
    causing portions of a memory state of said first virtual machine to be marked;
    causing execution of said first virtual machine to be resumed; and receiving and storing, during execution of said first virtual machine, portions of the memory state of said first virtual machine, the marked portions of the memory state being queued for delivery when said first virtual machine indicates that the marked portions will be modified, wherein an order of the queued marked portions is updated as the marked portions are delivered.

10. The computer-readable storage medium of claim 9, wherein a copy of the marked portions is created and queued for delivery and the marked portions are unmarked when said first virtual machine indicates that the marked portions will be modified.

11. The computer-readable storage medium of claim 9, wherein the marked portions of the memory state are marked as write-protected.

* * * * *